United States Patent Office 3,481,871
Patented Dec. 2, 1969

3,481,871
DITHIOETHANE DERIVATIVES AND ORGANIC COMPOSITIONS CONTAINING THE SAME
Herbert Myers, Barrington, and Alfred P. Kozacik, Woodbury, N.J., assignors to Mobil Oil Corporation, a corporation of New York
No Drawing. Filed Apr. 24, 1967, Ser. No. 632,907
Int. Cl. C10m *1/38, 3/32;* C07c *149/12*
U.S. Cl. 252—45                                12 Claims

ABSTRACT OF THE DISCLOSURE

Novel organo-sulfur derivatives are produced by reacting a mercaptan with a sulfur chloride compound, reacting the resulting organic sulfenyl or thiosulfenyl chloride with an olefin, and finally reacting the resulting product with a metal sulfur-containing salt. The final product may be used in lubricating oils and other industrial fluids as a load-carrying additive.

FIELD OF INVENTION

This invention relates to organic compositions containing novel organo-sulfur derivatives of dithioethanes, and to a method of producing these derivatives.

PRIOR ART

In U.S. Patents Nos. 2,708,199 and 2,886,593, specific sulfur compounds have been disclosed. In the first-named patent, there is disclosed a method of producing organic polysulfides by reacting an olefin having from 6 to 30 carbon atoms with a sulfur halide and by condensing the resulting di(haloalkyl)sulfur product with a water soluble inorganic polysulfide. The product is a polysulfide polymer of the olefin reactant. In the second patent there is disclosed a process of reacting a mercaptan or an organo sulfide with a sulfide halide to produce an organo sulfenyl halide. When the organic groups of the sulfide are different, two different products are formed. The discovery of newer and even more effective load-carrying additives for industrial fluids than those of the prior art is desirable.

SUMMARY OF INVENTION

It has now been discovered that novel sulfide derivatives of thioethane compounds provide excellent extreme pressure properties to organic industrial fluids. The compounds of this invention have the structure

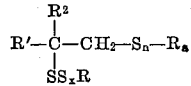

wherein R may be alkyl, cycloalkyl, aralkyl, aryl, alkaryl and derivatives thereof containing halogen, oxygen and nitrogen atoms, the total number of carbon atoms ranging from 1 to about 30, R' and R² may each be hydrogen or alkyl, cycloalkyl, aralkyl, aryl, alkaryl and substituted derivatives thereof containing halogen, oxygen and nitrogen atoms and the total of R' and R² having from 1 to about 30 carbon atoms; $x$ and $n$ may each range from 1 to 3; and $R_a$ may be hydrogen, alkyl, aralkyl, cycloalkyl, aryl, alkaryl, or the radicals:

—C≡N

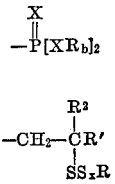

and

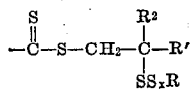

wherein R', R², and $x$ have the above definitions, and X is oxygen or sulfur, Y is oxygen, sulfur or nitrogen and $R_b$ is hydrogen, or alkyl, cycloalkyl, aralkyl, aryl or alkaryl having from 1 to 20 carbon atoms. $R_b$ may also contain nitrogen-, oxygen- or sulfur-containing substituents.

DESCRIPTION OF SPECIFIC EMBODIMENTS

The products of this invention are produced by reacting (1) a mercaptan, RSH, with (2) a sulfur halide. The resulting organosulfenyl halide is then reacted with (3) an olefin, $CR^1R^2=CH^2$, to produce an organo thioethyl halide intermediate. The mole ratios of the three reactants are preferably 0.75 to 1:1:0.75 to 1.2, respectively. If desired, all three components, mercaptan, sulfur halide and olefin, may be reacted together in a combined reaction. One unsaturated carbon atom of the olefin is bonded to the halogen atom, while the other is bonded to the organosulfenyl radical. The final step in the reaction process is the reaction of the resulting organosulfenyl ethyl halide with (4) a metal salt containing one or more additional sullfur atoms. This reactant may be derived from alkali metal or ammonium salts. These salts may be organic or inorganic salts as indicated by the definition of —S$_n$—R$_a$. The metal or ammonium halide is split off in this step and the remaining sulfur containing radical replaces the halogen. Temperature of reaction may range from below room temperature, i.e., 0° C., up to 100° C. Although the reactions may be performed in a short time, up to 10 hours may sometimes be required to complete the reaction.

The mercaptans used in the initial reaction step include alkyl and aromatic mercaptans. Suitable mercaptans are the alkyl mercaptans, methyl, ethyl, propyl, isopropyl, butyl, secondary-butyl, tertiary-butyl, amyl, hexyl, decyl, and cyclo-hexyl; and the aromatic compounds thiophenol, thionaphthol, and benzyl mercaptan. Mercaptans or aromatic thiols of from 1 to about 30 carbon atoms may be used, although a range of from 1 to about 15 is preferred.

The sulfur halide reactant includes the known $S_xX_2$ compounds, where $x$ is already defined. Suitable reactants include sulfur monochloride and sulfur dichloride, sulfur monobromide and sulfur dibromide.

The olefin compound having ethylenic saturation at the 1-position, includes ethylene, propylene, butene-1, tertiary butene-1, isobutene-1, 2-methyl butene-1, 2,3-dimethyl butene-3, pentene-1, hexene-1, decene-1 and the like. Suitable aromatic olefins include styrene and allylbenzene. Olefins having from 2 to about 10 carbon atoms are preferred. However, as indicated earlier, the number of carbon atoms may be up to 30. The olefins of special interest according to this invention are those having no more than 2 to 5 carbon atoms in a straight chain, such as ethylene, propylene and the butylenes, normal or branched, wherein R' is hydrogen, methyl, ethyl, isopropyl, or t-butyl and $R^2$ is hydrogen or methyl. Derivatives of these olefins provide unexpectedly high extreme pressure properties to lubricating oil compositions.

The metal salt used in the final reaction in the process of this invention is a sulfur-containing metal salt capable of undergoing metal halide formation. The classes of salts include preferably the alkali metal and ammonium sulfides, both monosulfides and polysulfides. This salt is used to produce a diorganic sulfide. In other words, if two moles of the organothioethyl halide are reacted with for example, a metal sulfide, the product will consist of a bis(thioethyl)sulfide wherein two identical thioethyl radicals are attached to the sulfur atom. Instead of using a preformed polysulfide, this reaction may be accomplished by using a monosulfide in the presence of elemental sulfur; or the monosulfide may be used in the presence of carbon disulfide. Other suitable reagents include thiocarboxylates, xanthates or thiocarbonates, thiophosphates, thiocarbamates, thiocyanates, isothiocyanates, mercaptides and hydrosulfides, wherein the organic radicals may contain up to 20 carbon atoms.

The additives of this invention may be used in a number of industrial organic fluids, including mineral lubricating oils include ester lubricants, such as diesters of monohydric alcohols and dicarboxylic acids, esters of trimethylolalkane and monocarboxylic acids, and pentaerythritol-monocarboxylic acid esters, silicone fluids, synthetic hydrocarbon fluids, glycol ether fluids, acetals, polyphenyl ether fluids and the like. These fluids are not only used as lubricants, but also as power transmission fluids, as heat exchange fluids, in grease formulations and in other known industrial uses.

The following examples are intended to illustrate the invention. Percentages and parts are on a weight basis unless otherwise noted.

Example 1

Into a suitable reactor containing 824 grams (8.0 moles) of sulfur dichloride were added 446.5 grams (7.2 moles) of ethyl mercaptan dissolved in 731 grams (8.7 moles) of hexene. The addition was made over a ¾-hour period at between 5° and 10° C., followed by stirring at room temperature for another ¾-hour period and at 50° C. for a ½-hour period.

The resulting 2-ethyldithiohexyl chloride (1700 grams) was added over a ⅓-hour period to a solution of 717.6 grams (9.2 moles) of sodium sulfide in 1200 ml. of methanol. The reaction mixture was refluxed for 18 hours. Methanol was removed from the reaction mixture by distillation to 80° C. pot temperature. The resulting residue was mixed with 300 ml. of 25% aqueous sodium hydroxide for 4 hours at 80° C. The reaction product was then washed until neutral with water and dried by heating at 100° C. and 8.0 mm. Hg to yield 1000 grams of bis(2-ethyldithiohexyl)sulfide. Filtration through diatomaceous earth filter aid yielded a clear yellow product having 38.2% sulfur.

Example 2

In a suitable reactor 486.0 grams (5.4 moles) of tertiary butyl mercaptan was added to 618 grams (6.0 moles) of sulfur dichloride over a ⅔-hour period. The temperature of reaction was maintained at 20° to 25° C. and was stirred for an additional ¼-hour. Isobutylene was introduced at a rate of about 4 to 6 grams per minute for over an hour for a total of about 261 grams (4.7 moles). The reaction yielded 1154 grams of crude 2-methyl,2-tertiary butyl dithiopropyl chloride.

This product was added over a ⅓-hour period to a solution containing 468 grams (6.0 moles) of sodium sulfide in 2800 ml. of a 15% solution of isopropanol in water. The reaction mixture was refluxed for 6 hours. The organic phase was separated off and washed with water until neutral, and dried at 100° C. and 6 mm. Hg, yielding 672 grams of bis(2-methyl,2-tertiary butyldithiopropyl) sulfide. The clear yellow product obtained from filtration contained 44.5% sulfur.

Example 3

Using the procedure of Example 2, tertiary butyl mercaptan (2.7 moles) was reacted with sulfur dichloride (3.0 moles) and propylene (2.4 moles). The product obtained from the reaction was refluxed for 18 hours with sodium sulfide (3.5 moles) in 1 liter of methanol. The methanol was distilled to 80° C. at atmospehric pressure. The residue was dissolved in petroleum ether, water washed, dried and separated from the solvent by distillation to 100° C. at 5.0 mm. Hg. The clear yellow product upon filtration, was 400 grams of bis(2-tertiary butyldithiopropyl)sulfide and had 48.6% sulfur.

Example 4

Using the procedure of Example 2, tertiary butyl mercaptan (0.9 mole), sulfur dichloride (1.0 mole), and isobutylene (0.7 mole) were reacted. The resulting product was refluxed for 6 hours with sodium sulfide (0.6 mole) and sulfur (0.5 mole) in 2400 ml. of the isopropanol-water solution. The organic phase was treated as described before, the drying step performed at 100° C. and 20 mm. Hg for 1 hour. The clear yellow product from filtration was 863 grams bis(2-methyl,2-tertiary butyldithiopropyl) disulfide and contained 48.3% sulfur.

Example 5

Using the procedure of Example 2, tertiary butyl mercaptan (3.6 moles), sulfur monochloride (4.0 moles) and isobutylene (4.6 moles) were reacted together. The resulting product was refluxed for 6 hours in a solution of sodium sulfide (2.0 moles) in 1650 ml. of a 10% solution of isopropanol in water. The organic phase was treated as in the earlier examples, and dried at 100° C. and 5 mm. Hg for 1 hour. The product upon filtration was 682 grams of bis(2-methyl,2-tertiary butyltrithiopropyl)sulfide and contained about 51.4% sulfur.

Example 6

Using the procedure of Example 2, tertiary butyl mercaptan (5.0 moles), sulfur monochloride (5.6 moles) and isobutylene (4.7 moles) were reacted together. The resulting product was refluxed for 6 hours in a solution of sodium sulfide (2.8 moles) and sulfur (5.0 moles) in 2500 ml. of a 15% isopropanol solution in water. The organic phase was treated as in the other examples and dried at 100° C. and 7 mm. Hg for ½-hour. Filtration yielded 1085 grams of bis(2-methyl,2-tertiary butyltrithiopropyl)polysulfide. The clear yellow product contained 58.3% sulfur.

Example 7

Using the procedure of Example 2, tertiary butyl mercaptan (0.9 mole), sulfur dichloride (1.0 mole) and isobutylene (0.8 mole) were reacted together. The resulting intermediate product was refluxed for 6 hours in a solution of potassium thiocyanate (1.2 moles) in 300 ml. of methanol. The reaction mixture was filtered, removing the potassium chloride by-product and then diluted with an equal amount of water to precipitate out the product. The product was extracted with benzene and water-washed to neutral. The solvent was removed and filtration yielded 177 grams of a clear amber product, 2-methyl,2-tertiary butylidithiopropyl thiocyanate, containing 39.7% sulfur.

Example 8

Using the procedure of Example 7, an intermediate product similar to that of Example 7 was refluxed with a slurry of sodium isopropyl xanthate (1.0 mole) in methanol. Work-up of the product yielded 189 grams of a clear yellow product, 2-methyl,2-tertiary butyldithiopropyl, isopropyl xanthate, containing 43.3% sulfur.

Example 9

Using the procedure of Example 7, an intermediate product similar to that of Example 7 was reacted with a solution of sodium sulfide (0.6 mole) and carbon disulfide (0.6 mole) in methanol. Work-up of the reaction mixture yielded 143 grams of a clear yellow product, bis(2-methyl,2-tertiary butyldithiopropyl)trithiocarbonate, containing 45.5% sulfur.

Example 10

Using the procedure of Example 7, an intermediate product similar to that of Example 7 was reacted with sodium tertiary butyl mercaptide (1.1 moles) in toluene. Work-up of the reaction mixture yielded 158 grams of a clear pale yellow product, 2-methyl,2-tertiary butyldithiopropyl tertiary butyl sulfide, containing 42.3% sulfur.

Example 11

Using the procedure of Example 2, 84 grams (0.04 mole) of tertiary butyl mercaptan, 103 grams (1.0 mole) of sulfur dichloride and 45 grams (0.80 mole) of isobutylene were reacted together. The resulting intermediate product was refluxed for 7 hours in a solution of 340 grams (1.20 moles) of potassium di-n-butyl phosphorodithioate in 500 ml. of methanol. Potassium chloride by-product was removed by filtration. The remaining reaction mixture was mixed with an equal volume of water and the product was precipitated. This product was extracted with benzene and water-washed. The solvent was distilled off at 100° C. and 8 mm. Hg pressure. Filtration of the residue yielded 270 grams of a clear yellow product, O,O-di-n-butyl, S-2-methyl,2-tertiary butyldithiopropyl phosphorodithioate. The product contained 32.4% sulfur and 7.4% phosphorus.

EVALUATION OF PRODUCTS

The reaction products of this invention were evaluated as extreme pressure additives in lubricating oils in the 1000 SAE Load-Carrying Test. In this test, the load-carrying capacity of a lubricant is measured under high speed shock conditions.

Each oil composition to be tested was used in the machine as a lubricant for two steel test rings which are rotated in such a manner to produce a combination of rolling and sliding actions against each other's surfaces, while a gradually increasing load is mechanically applied. Scoring or seizure of the rings signifies the end of the test. The load at that point is recorded. The test lubricant contains 2% of the additive. The base oil is a SAE-90 solvent-refined Mid-Continent oil. The results of the tests tabulated below represent two duplicate runs.

| Additive (product of example): | Seizure load,[1] lbs. |
|---|---|
| None | 20–50 |
| 1 | 225, 230 |
| 2 | 460+, 460+ |
| 4 | 460+, 460+ |
| 5 | 460+, 460+ |
| 6 | 460+, 460+ |
| 7 | 460+, 460+ |
| 8 | 460+, 460+ |
| 9 | 460+, 460+ |
| 10 | 460+, 460+ |
| 11 | 460+, 460+ |

[1] Maximum scale measurement 460 lbs.

It is thus seen that the additives of the present invention particularly those prepared in Examples 2 to 11, provide advantageous and unusual advantages for lubricating oil compositions. The additives contain a high percent of sulfur, several as high as almost 60%.

These additives as indicated previously may be utilized in a number of different base media including mineral oils, synthetic ester oils, synthetic hydrocarbon oils, polyalkylene oxide or fluids, silicone fluids, acetals, polyphenyl ether fluids, and the like. Moreover, these additives are compatible with most of the other additives normally used with such base media, including antioxidants, detergents, high temperature stabilizers, load-carrying agents, viscosity index improvers, and thickening agents for grease compositions.

The statements, illustrations and working embodiments, described heretofore serve to illustrate the invention which is limited to only by the following claims.

We claim:

1. An organic fluid composition comprising a major proportion of a mineral or synthetic oil medium and a minor proportion sufficient to provide extreme pressure properties thereto of a sulfide derivative of a 1,2-dithioethane, said sulfide having the structure

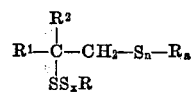

wherein R is selected from the group consisting of alkyl, cycloalkyl, aralkyl, aryl and alkaryl containing up to 30 carbon atoms, $R^1$ and $R^2$ are each selected from the group consisting of hydrogen, alkyl, cycloalkyl, aralkyl, and aryl having a total of up to 30 carbon atoms, $x$ and $n$ are each 1 to 3 and $R_a$ is selected from the group consisting of hydrogen, alkyl, cycloalkyl, aralkyl, aryl, alkaryl

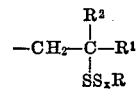

and

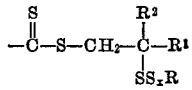

wherein R, $R^1$, $R^2$ and $x$ are as defined herein.

2. The composition of claim 1 wherein the sulfide derivative 1,2-dithioethane is a bis(1,2-dithioethane)sulfide.

3. The composition of claim 1 wherein $—S_n—R_a$ is derived from a sulfur-containing compound selected from the group consisting of alkali metal and ammonium mercaptides, the organo groups thereof having from 1 to 20 carbon atoms, and hydrosulfides.

4. The composition of claim 1 wherein R is alkyl having from 1 to 10 carbon atoms.

5. The composition of claim 4 wherein R is selected from the group consisting of ethyl, propyl, butyl and tertiary butyl.

6. The composition of claim 1 wherein R' is selected from the group consisting of hydrogen, methyl, ethyl, isopropyl, and tertiary butyl, and $R^2$ is selected from the group consisting of hydrogen and methyl.

7. The composition of claim 6 wherein $R^1$ and $R^2$ are methyl.

8. The composition of claim 1 wherein $R_a$ is

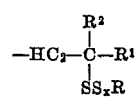

9. The composition of claim 1 wherein the organic fluid medium is a lubricating oil.

10. The composition of claim 1 wherein the sulfide derivative is bis(2-tertiary butyldithiopropyl)sulfide.

11. The composition of claim 1 wherein the sulfide derivative is selected from the group consisting of bis(2-methyl, 2-tertiary butyldithiopropyl)sulfide; bis(2-methyl, 2-tertiary butyldithiopropyl)disulfide; bis(2-methyl,2-tertiary butyltrithiopropyl)sulfide, and bis(2-methyl,2-tertiary butyltrithiopropyl)polysulfide.

12. The composition of claim 1 wherein the sulfide derivative is 2-methyl,2-tertiary butyldithiopropyl tertiary butyl sulfide.

References Cited

UNITED STATES PATENTS 2,257,290   9/1941   Voorhies _____ 252—45 X

DANIEL E. WYMAN, Primary Examiner
W. CANNON, Assistant Examiner

U.S. Cl. X.R.

252—46.6, 47, 48.2, 48.6; 260—454, 455, 608, 934, 947

PO-1050
(5/69)

UNITED STATES PATENT OFFICE
CERTIFICATE OF CORRECTION

Patent No. 3,481,871      Dated December 2, 1969

Inventor(s) HERBERT MYERS and ALFRED P. KOZACIK

It is certified that error appears in the above-identified patent and that said Letters Patent are hereby corrected as shown below:

Column 2, line 40 "sullfur" should read --sulfur--.
Column 3, line 31, between the words "oils" and "includes", add --and synthetic lubricating oils. The synthetic lubricating oils--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents